United States Patent [19]

Null

[11] 4,205,628
[45] Jun. 3, 1980

[54] ANIMAL CONDITIONER

[76] Inventor: Robert L. Null, P.O. Box 933, Huntington, W. Va. 25712

[21] Appl. No.: 954,217

[22] Filed: Oct. 24, 1978

[51] Int. Cl.² .............................................. A01K 15/00
[52] U.S. Cl. ..................................................... 119/29
[58] Field of Search ...................... 119/29, 158; 272/69

[56] References Cited

U.S. PATENT DOCUMENTS

| 2,969,768 | 1/1961 | Grant | 119/29 |
|---|---|---|---|
| 3,900,008 | 8/1975 | Jinnette | 119/51.11 X |
| 4,095,561 | 6/1978 | Ruetenik | 119/29 |

Primary Examiner—Louis G. Mancene
Assistant Examiner—Robert P. Swiatek
Attorney, Agent, or Firm—Sherman Levy

[57] ABSTRACT

An animal exercising or conditioning apparatus is provided that has a rugged construction and wherein there is provided a straight-line walk. The animal conditioner or horse exerciser includes an inclined surface that keeps the horse walking up hill and shortens work out time. There is further provided a variable motor speed control and an automatic timer that turns the device off after preselected workout time, and there is also provided a loading gate that allows easy handling.

6 Claims, 7 Drawing Figures

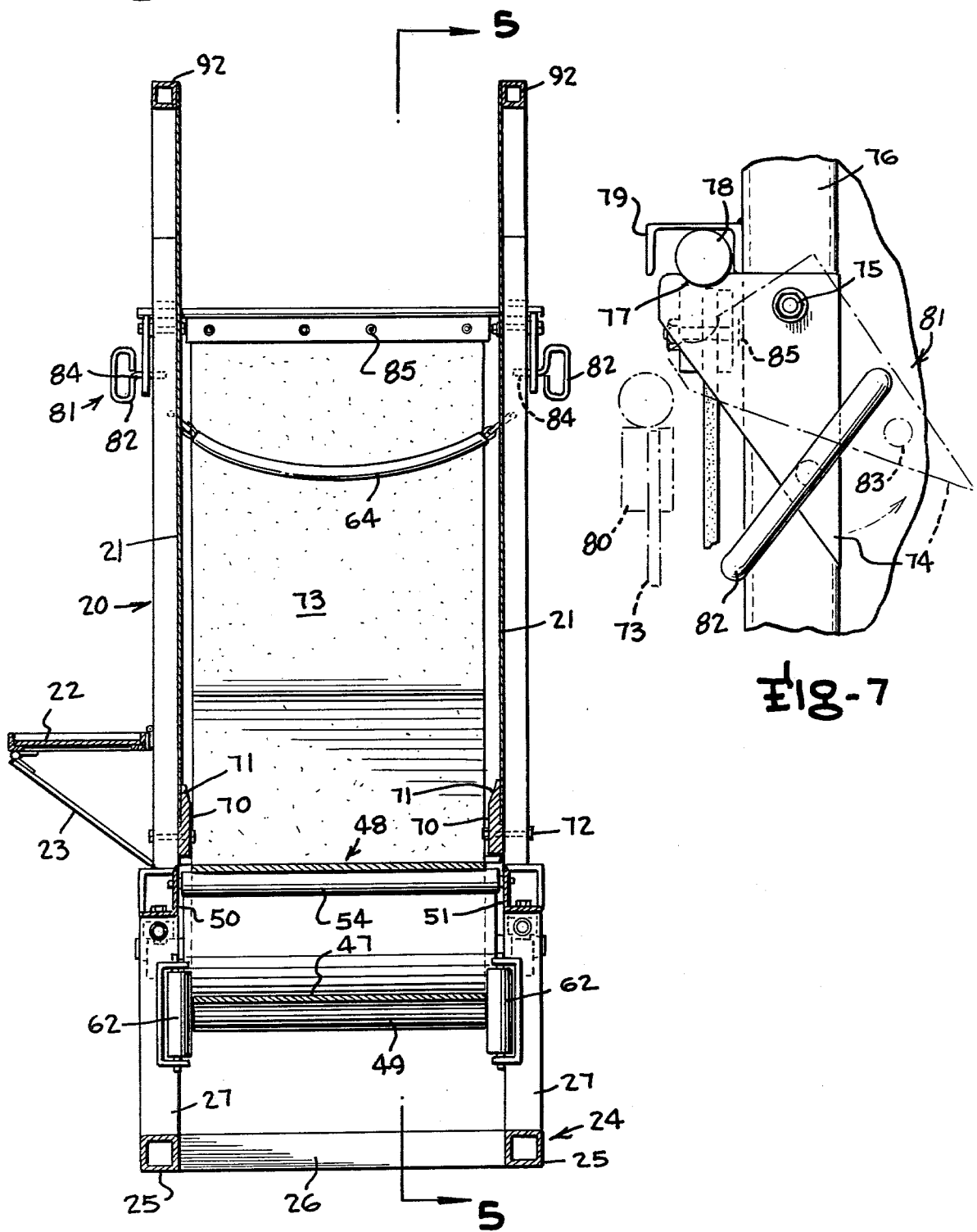

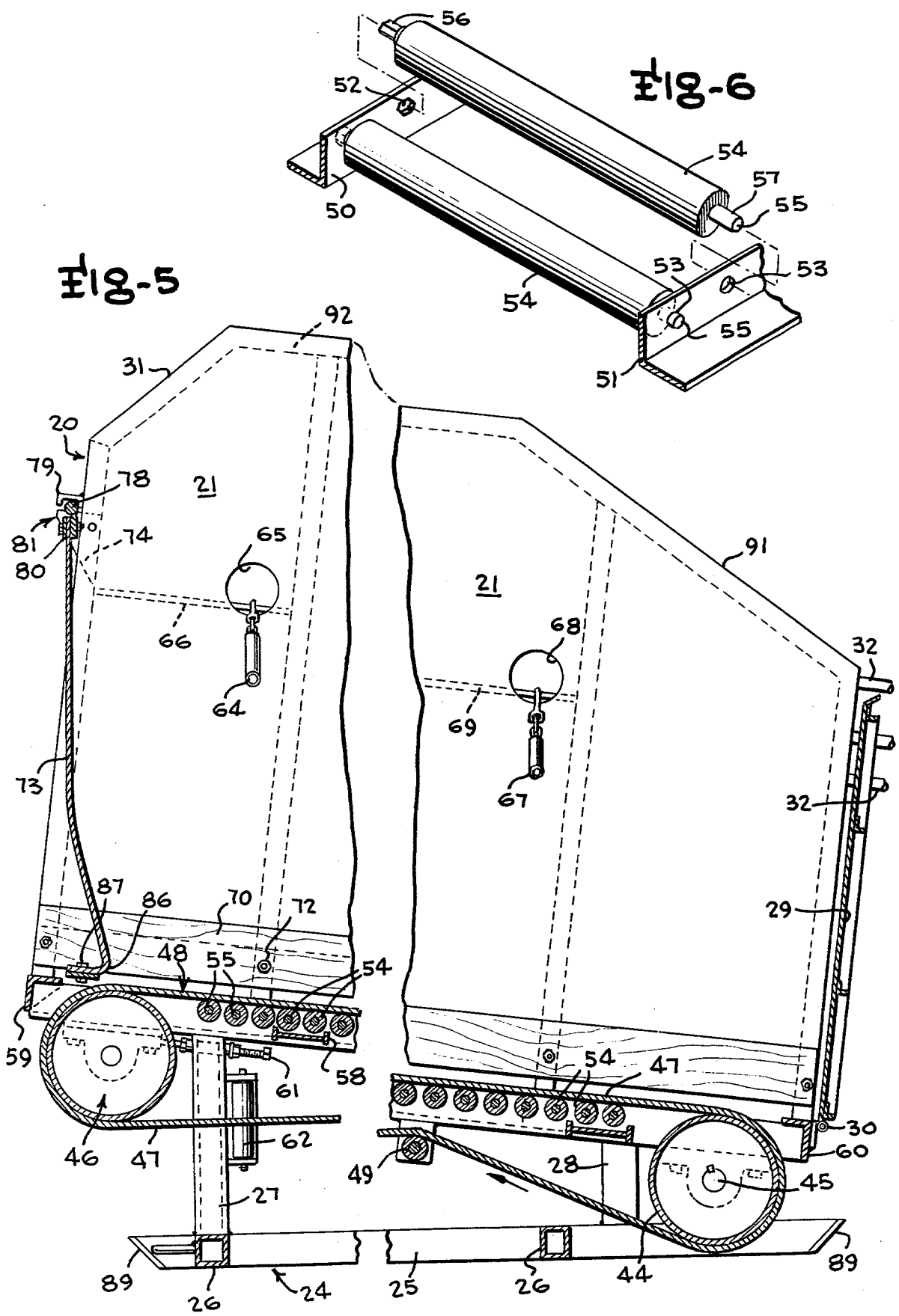

ANIMAL CONDITIONER

BACKGROUND OF THE INVENTION

A power-driven treadmill is provided wherein animals such as horses can be kept in peak condition and wherein an improved method is provided for giving needed exercise to horses and the like, as well as cutting handling costs.

Patents of which the inventor is aware include: U.S. Pat. Nos. 763,360; 1,161,183; 2,969,768; 3,485,213; 3,709,197; and 4,095,561.

None of these references anticipate the following specification and claims in that they are all relegated to well-known and established apparatus for exercising animals and the like.

FIELD OF THE INVENTION

The present invention relates to animal exercising devices or apparatus and more particularly to exercising devices for horses, wherein horses can be conditioned to have improved strength, stamina, and appearance.

In accordance with the present invention, there is provided a horse exercising and conditioning apparatus that includes an exclusive break away front retaining belt, as well as improved safety features, and wherein the apparatus is constructed so that water, adverse weather conditons and the like, will not adversely affect the apparatus, and wherein the device will be long-lasting and will provide top performance.

The primary object of the present invention is to provide a horse exercising apparatus which will reduce time and fatigue on the trainer, control speed and length of work outs, eliminate excessive leg strain, help spot abnormal walking patterns, and prevent self injury during rehabilitation, and breading season.

Still another object of the present invention is to provide a horse exercising device that will aide in rehabilitation of legs and muscles of horses, restore sleek appearance to the animals, help build stamina, and help strengthen muscles.

Still another object of the present invention is to provide an animal exerciser and conditioner that has improved characteristics and advantages as compared to previous devices.

Still another object of the present invention is to provide an animal exerciser and conditioner that is generally rugged in construction and simple and inexpensive to manufacture and efficient to use.

Other objects and advantages of the present invention will become apparent in the following specification when considered in the light of the attached drawings.

BRIEF DESCRIPTION OF THE DRAWINGS

FIG. 4 is a sectional view taken on the line 4—4 of FIG. 3;

FIG. 5 is a sectional view taken on the line 5—5 of FIG. 4;

FIG. 6 is a fragmentary perspective sectional view, illustrating certain constructional details of the present invention;

FIG. 7 is a fragmentary elevational view, illustrating a quick release mechanism.

DESCRIPTION OF THE PREFERRED EMBODIMENTS

Figure 2:
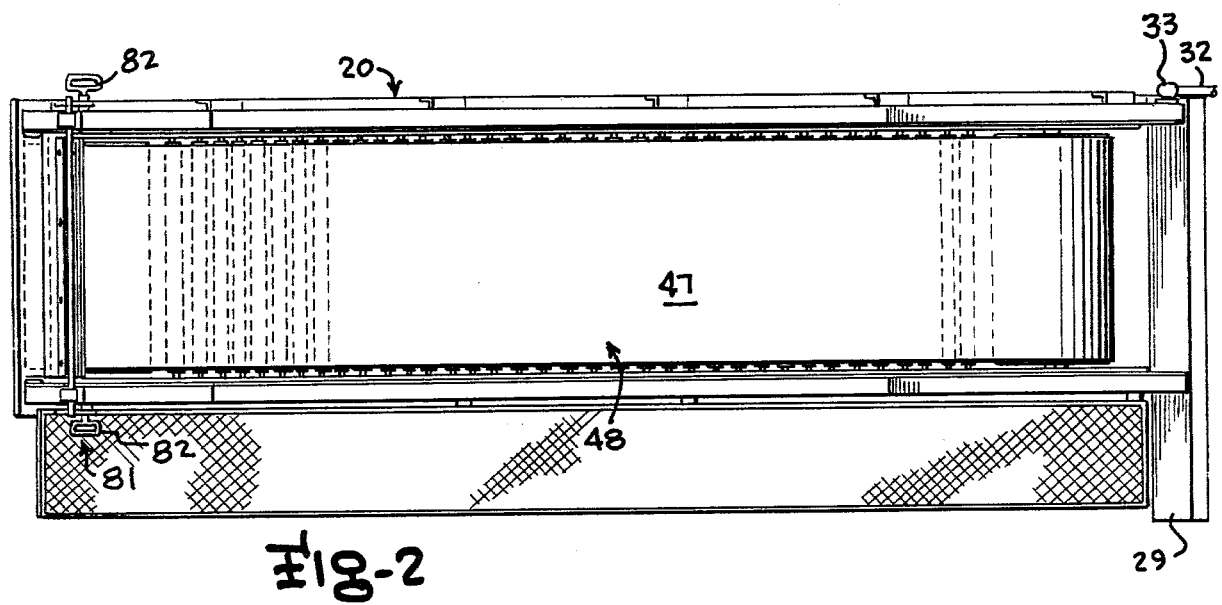
FIG. 2 is a top plan view thereof.
Figure 1:
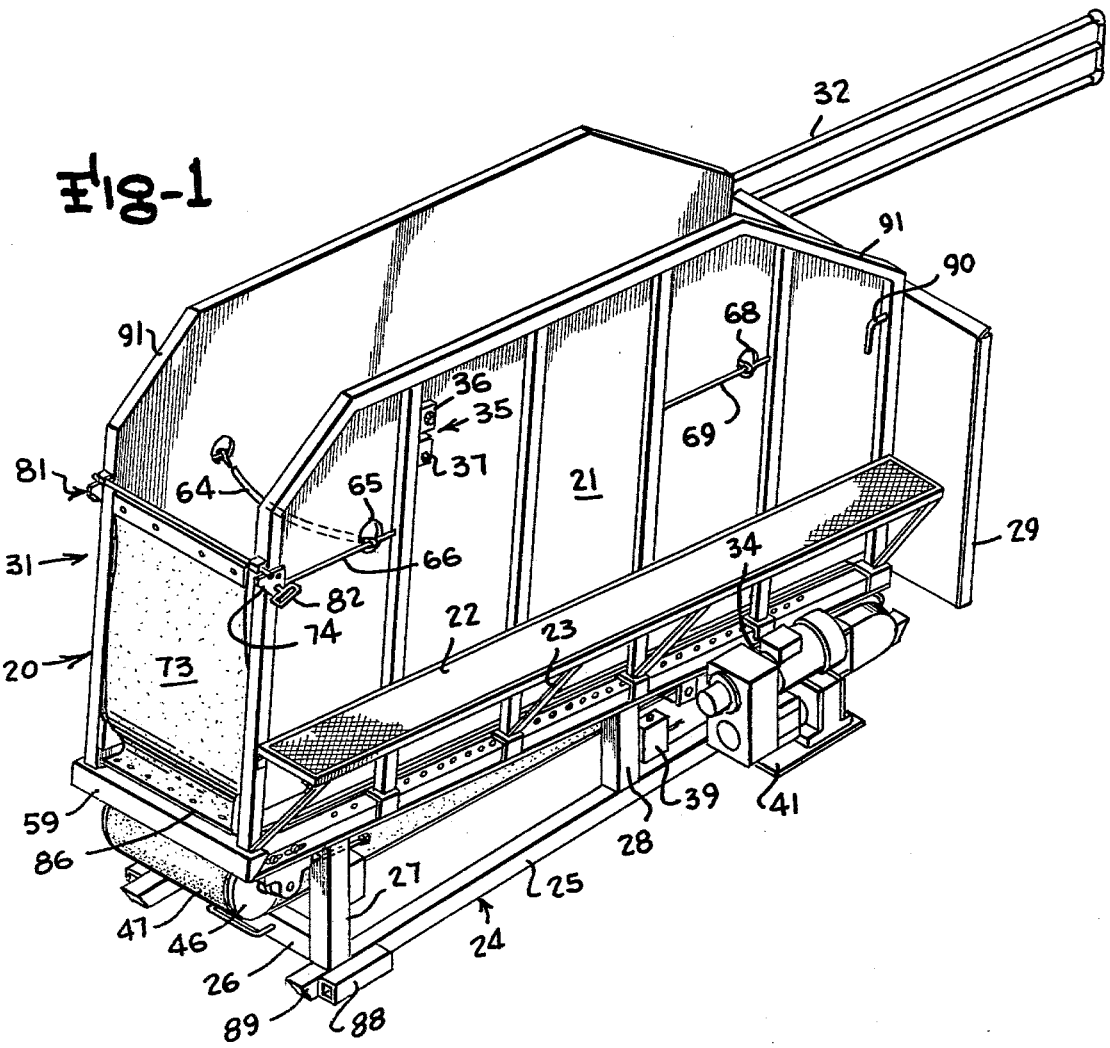
FIG. 1 is a perspective view of the animal exerciser of the present invention.

Referring in detail to the drawings, the numeral 20 indicates the animal exerciser of the present invention, and the exerciser 20 includes a body or enclosure 31, FIG. 1. The body 31 includes a pair of spaced parallel vertically disposed side walls 21. Arranged along side one of the walls 21 is a walkway 22 which is adapted to conveniently support one or more persons operating the device 20, and the walkway 22 can be supported by inclined braces 23.

The body structure is supported on a base 24 that includes spaced parallel horizontally disposed beams 25, and the beams 25 have horizontally disposed cross pieces 26 extending therebetween and being secured thereto as by welding. Mounted on the beams 25 are vertically disposed legs or support members 27 and 28, and the support members 27 are longer than the support members 28, so that the device will have an incline as later described in this application. A ramp 29 is hingedly connected as at 30 to the entrance end of the body 31, and an animal loading gate 32 is swingably or hingedly connected to the entrance end of the body as at 33, FIG. 3.

An electric motor 34 is arranged adjacent the apparatus 20, and the motor 34 and its associated parts may be supported on a supporting structure 41. A switch mechanism 35 is provided for controlling operation of the motor 34, and the switch mechanism 35 includes an "on and off" switch 36 and a timer 37, and these switches have electric cables or conductors 38 connecting the same to a junction box 39, and the member 39 is electrically connected to the motor 34, as at 40. The motor 34 has a member such as a gear box 42 operatively connected thereto, and the gear unit 42 serves to actuate or operate a chain and sprocket mechanism 43, and the chain and sprocket mechanism 43 are operatively connected to a shaft 45 of a drive roller 44.

There is further provided a driven roller 46, and the rollers or drums 44 and 46 have an endless belt 47 trained thereover, and the belt 47 provides a movable exercising surface or treadmill 48 for animals such as a horse that is positioned in the enclosure 31.

As shown in FIG. 5, an idler roller 49 is mounted below the lower portion of the belt 47. The treadmill 48 further includes a pair of spaced parallel inclined channel members or frame members 50 and 51, FIG. 6. The frame member 50 is provided with a plurality of spaced apart openings 52 which may have a suitable shape, as for example the openings 52 may have a hexagonal shape. Openings or apertures 53 are arranged in the other channel member in registry with the openings 52, and the openings 53 have a circular shape. Support rollers 54 are provided as shown in FIGS. 5 and 6, and the rollers 54 are mounted below the upper portion of the belt 57 to give support thereto, as for example when a horse or other animal is supported thereon. The rollers 54 are rotatably mounted on shaft 55, and one end of the shaft 55 is cylindrical as at 57 for projecting through the openings 53, and the other end of the shaft 55 has a shape such as a hexagonal shape so that the hexagonal end 56 can be snugly received in the openings 52. This construction serves to assure that the rollers 54 can conveniently rotate on the stationary members 55, and the members 55 are stationary due to the provision of the snugly interfitting portions 56 in the openings 52.

There is further provided breast and butt animal restraining cables or members 64 and 67. The restraining member 64 can be arranged so that its ends extend through openings 65 in the side wall 21 for engaging retaining rods 66. Similarly, the butt restraining cable 67 can have hooks or the like on its ends adjacent the opening 68 so that the hooks on the end of the cable 67 can be held in place by retaining rods 69.

Braces or guards 70 are mounted adjacent the lower inner portions of the side walls 21, and the guards 70 have bevelled or inclined surfaces 71 thereon, and the guards 70 are secured in place as for example by means of securing elements 72.

There is further provided an end member 73 that has a generally flexible construction, and a quick release mechanism 81 is provided for the end member 73, FIG. 7. The quick release mechanism 81 includes a pair of spaced apart plates or brackets 74 which are each pivotally connected to members 76 by means of pivot pins 75. The plates 74 have a recessed portion 77. Mounted on the upper end of the end member 73 is a rod 78 which is arranged adjacent top elements 80. Manually removable keys or pins 82 have shank portions 84 that are adapted to extend through openings 83 in the plates 74 to engage corresponding selectively registering openings in the member 76. When the pins or keys 82 are manually removed, the shank portions 84 can be disengaged from the openings 83 to permit the parts to move from the solid line position shown in FIG. 7 to the broken line position shown in FIG. 7. The top elements 80 are secured to the member 73 as for example by means of element 85. A bottom piece 86 is suitably affixed to the lower end of the member 73 as at 87, FIG. 5.

The screw member 61 can be provided for maintaining the proper tension on the belt 47, by adjusting the tension on the roller or drum 46. End pieces 59 and 60 extend between the frame members 50 and 51 as shown in the drawings. The beams 25 of the base structure 24 have suitable members 88 arranged contiguous thereto and affixed thereto. The ends of the beams 25 can be inclined or belevled as at 89.

From the foregoing, it will be seen that there has been provided an animal exercising apparatus which is especially suitable for exercising and training animals such as horses. However, it is to be understood that the present invention can be used for exercising other animals besides horses.

In use, with the parts arranged as shown in the drawings, the apparatus 20 can be positioned in a suitable location on the base or supporting structure 24, and the operator can conveniently stand on the walkway 22. The gate 32 can be used for guiding or loading the horse into the enclosure 31, and the horse is adapted to enter the open end of the enclosure 31 by walking up the ramp 29. After the horse enters the enclosure or stall 31, the ramp 29 can be raised vertically about its hinge 30, and the ramp 29 can be maintained in its raised position by means of a locking mechanism 90.

Similarly, after the horse has been guided into the enclosure 31, the gate 32 can be moved to a position contiguous to the enclosure 31. The members 64 and 67 serve to restrain the horse in its proper position because the members 64 and 67 are adapted to engage the breast and butt of the horse. In order to exercise the horse, it is only necessary to manually actuate the switch mechanism 35 so that the on and off switch 36 and timer switch 37 can be set to operate in the desired manner, whereby the motor 34 will be energized, and it is to be understood that the motor 34 can be connected to a suitable source of electrical energy. As the motor 34 is energized, it actuates the gear drive 42 which in turn actuates the chain and sprocket mechanism 43, and this provides power for the drive roll 44, so that the belt 47 will be moved in the direction of the arrows, FIG. 5, whereby a horse supported on the belt 48 will be caused to be exercised in the desired manner.

A plurality of support rollers 54 are arranged below the upper portion of the belt 48 to provide support for the belt and horse thereon. The guide rollers 62 help maintain the belt 47 in its proper position. Furthermore, when necessary, the end member 73 can be quickly released by means of the mechanism 81 shown in FIG. 7. Thus, by manually removing or disengaging the pins 82 from their respective apertures or openings 83, the plates 74 can pivot in a clockwise direction, FIG. 7, so that the rod 78 on the upper end of the member 73 will become disengaged from the recessed portion 77 in the plates 74, whereby the end member 73 can be quickly released when desired or required.

Figure 3:
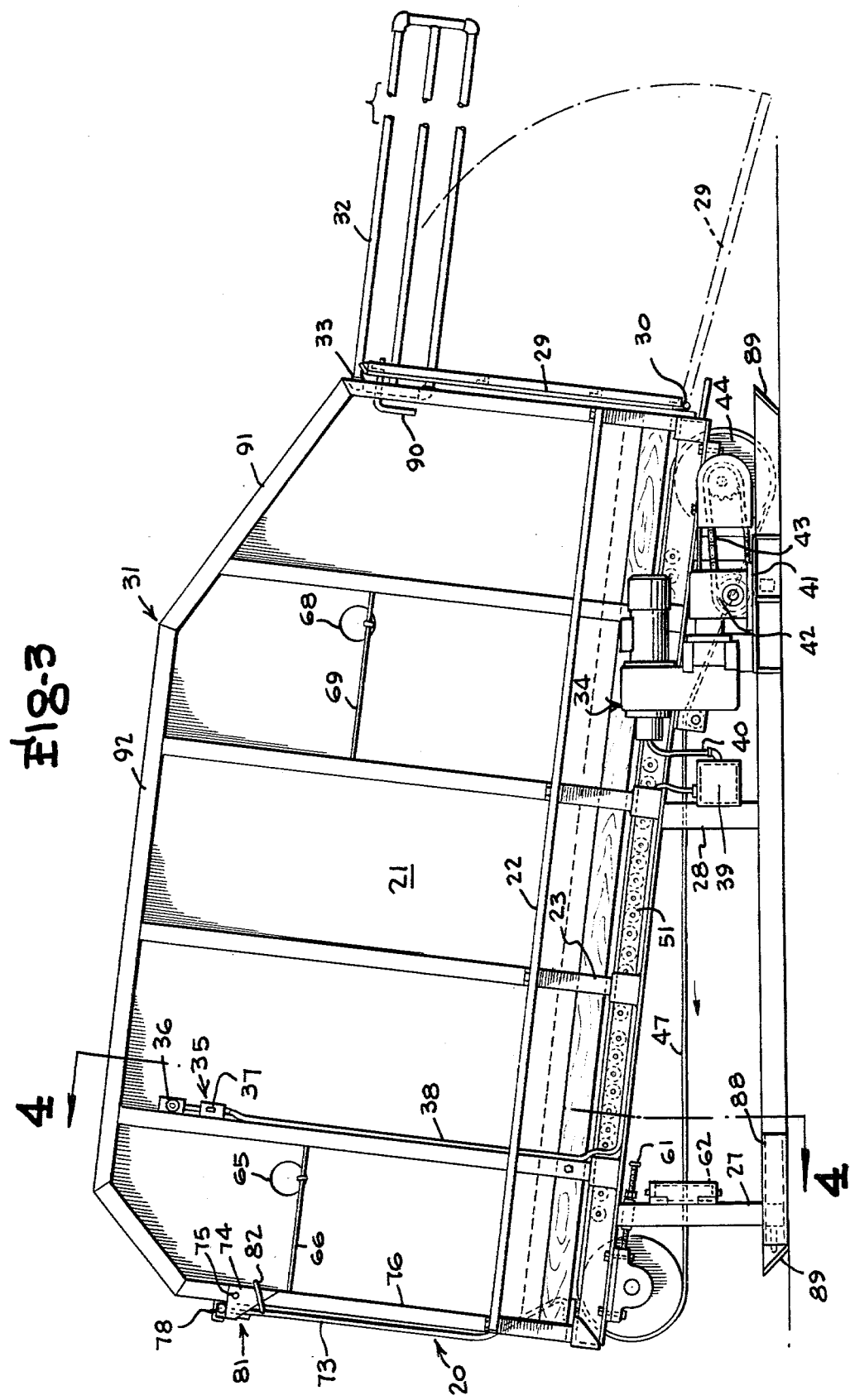
FIG. 3 is a side elevational view thereof.

Upper corner portions of the side walls are cut away or inclined as at 91, see FIG. 3, and channel pieces 92 are arranged on the edge portions of the side walls, and this provides a safety construction or feature for the apparatus.

An important aspect or feature of the present invention is the drop front, including the member 73 of the exerciser. While other machines apparently provide no relief for the situation where the animal might jump up over the front end of the exerciser, the apparatus of the present invention provides that the front end 73 may be let down by simply removing two pins 82, thus freeing the animal promptly and safely.

It will be seen that there has been provided a treadmill conditioner for horses that is similar to a treadmill exerciser. Various accessories can be provided as desired or required.

The present invention possesses certain important differences and advantages over prior such devices. For example, with the present invention there is provided an exclusive break away front retaining belt which is an important safety factor, should a horse get caught on top of the front belt. A front belt is tight to prevent a horse from getting a leg through and between the belt and steel side. The take up is constructed to operate from the rear of the head pulley and the parts are ruggedly constructed. The belt rollers and idler roller include spring loaded shafts. The standard bottom base is of solid construction to prevent water and weather from entering and causing rust so that the present invention will have a long life.

The bottom base has a proper number of vertical supports, and a loading guide is provided on the opposite side from the controls. There is provided the side idlers 62. The drive pulley is mounted to the bottom of the idler support angles. The roller support angles are provided with hex shaped openings 52 as well as the circular openings 53, so that the roller shafts 55 will not turn with the rollers 54. The belt 47 is adapted to be spliced together with a heavy duty fastener instead of being laminated or the like. The drive based plate has a rugged construction and has a vertical support plate going up the back side of the drive.

The entire machine is made of heavy guage material with a solid construction so that there is provided an apparatus that will withstand heavy usage for a long period of time.

With further reference to the quick release mechanism 81, it will be seen that by manually removing the pins 82, the rod 78 will drop out of the recesses 77 because all of the weight of the rod 78 is forward of the pivot point 75. The back gate 29 hinges to form a ramp for the horse to walk on.

It will therefore be seen that there has been provided an animal or horse exerciser which is adapted to be conveniently used for conditioning horses to improve their strength, stamina, and appearance. Horses can be kept in peak condition all year round with the present invention, and wherein horses will be exercised and wherein handling costs can be minimized. The device will help strengthen muscles, build stamina, help restore good appearance to the animals, aid in rehabilitation of the legs and muscles, and help prevent self injury during rehabilitation and during the breeding season. The apparatus will also help spot abnormal walking patterns, eliminate excessive leg strain, control speed and length of workouts, and reduce time and fatigue on the trainer.

The device has a rugged steel construction that assures long wear with low maintenance. There is provided a straight line walk that helps trainers detect problems in the way of travel. The exercising surface or unit 48 is arranged at an incline to keep the horse walking up hill and to shorten workout time, and to help build hind quarters while removing extra stress from the forelegs. The user can select the proper pace with variable motor speed control from a slow walk to a fast trot. The automatic timer on the switch mechanism 35 turns the device off after a preselected workout time, as for example, up to 60 minutes. The loading gate 32 allows easy handling.

The device of the present invention includes a power driven treadmill that does the work, and while one horse is working out, the trainer or other person can concentrate on other things such as watching the horses performance, improving his training and working with other horses.

It will now be clear that there is provided a device which accomplishes the objectives heretofore set forth. While the invention has been disclosed in its preferred form, it is to be understood that the specific embodiment thereof as described and illustrated herein is not to be considered in a limited sense since there may be other forms or modifications of the invention which should also be construed to come within the scope of the appended claims.

What is claimed is:

1. As a new article of manufacture, an animal exerciser comprising an enclosure including a pair of spaced parallel side walls, a treadmill, a walkway mounted along one side of said side walls, a base including a pair of spaced parallel beams, cross pieces extending between said beams and secured thereto, vertically disposed support members mounted on said beams, certain of said support members being of greater height than the other support members, a ramp hingedly connected to an entrance end of the enclosure, a loading gate swingably connected to the entrance end of the enclosure, a motor positioned contiguous to said enclosure, switch means, including an on and off switch and a timer electrically connected to said motor, chain and sprocket means operatively connected to and driven by said motor, the lower portion of the enclosure being inclined, whereby the entrance end is lower than the other end thereof, the treadmill being in the lower portion of said enclosure, said treadmill including an endless belt, a drive and driven roller having said belt trained thereover, means operatively connecting said drive roller to said chain and sprocket means, a pair of spaced parallel frame members in the bottom of said enclosure, and one of said frame members having circular openings therein and the other frame member having non-circular openings therein, support rollers having shafts extending therethrough, one end of the last named shafts being snugly received in the non-circular openings in the frame member, breast and butt restraining members in the enclosure, a drop front for said enclosure, and a quick release mechanism for said drop front, said quick release mechanism comprising removable pins, plates pivotally connected to said side walls, said plates having recessed portions thereon for selectively receiving a rod on the upper end of the drop front, there being apertures for selectively receiving said pins.

2. In an animal exerciser, an enclosure including spaced parallel vertically disposed side walls, an inclined treadmill mounted adjacent to the lower portion of said enclosure, said treadmill including drive and driven rollers, an endless belt trained over said rollers, motor means operatively connected to said drive roller for rotating said belt, switch means including an on and off switch and a timer for said motor means, a loading gate pivotally connected to an end of the enclosure, a ramp hingedly connected to an end of the enclosure, a drop front on an end of the enclosure, and quick release means for said drop front, said drop front including a flexible member having a rod on its upper end, said quick release mechanism comprising removable pins, plates pivotally connected to said side walls, said plates having recessed portions thereon for selectively receiving the rod on the upper end of the drop front, there being apertures for selectively receiving said pins.

3. The structure as defined in claim 2, and further including a bottom piece affixed to the lower end of said drop front.

4. The structure as defined in claim 3, and further including a plurality of support rollers mounted below the upper portion of the belt, and shaft means for supporting said support rollers, said last named shaft means being stationary so that the support rollers can rotate thereon.

5. The structure as defined in claim 3, and further including guide rollers engaging the side surfaces of the belt, said belt being arranged on an incline.

6. As a new article of manufacture, an animal exerciser comprising an enclosure including a pair of spaced parallel side walls, a walkway mounted along one side of said side walls, a base including a pair of spaced parallel beams, cross pieces extending between said beams and secured thereto, vertically disposed support members mounted on said beams, certain of said support members being of greater height than the other support members, a ramp hingedly connected to an entrance end of the enclosure, a loading gate swingably connected to the entrance end of the enclosure, a motor positioned contiguous to said enclosure, switch means, including an on and off switch and a timer electrically connected to said motor, chain and sprocket means operatively connected to and driven by said motor, the lower portion of the enclosure being inclined, whereby the entrance end is lower than the other end thereof, a treadmill in the lower portion of said enclosure, said treadmill including an endless belt, a drive and driven roller having said belt trained thereover, means operatively connecting said drive roller to said chain and sprocket means, a pair of spaced parallel frame members in the bottom of said enclosure, and one of said frame members having circular openings therein and the other frame member having non-circular openings therein, support rollers having shafts extending therethrough, one end of the last named shafts being snugly received in the non-circular openings in the frame member, breast and butt restraining members in the enclosure, a drop front for said enclosure, and a quick release mechanism for said drop front, said quick release mechanism comprising plates pivotally connected to said side walls, said drop front including a flexible member having a rod affixed to its upper end, said plates having recessed portions for selectively receiving said rod, there being selectively registering apertures in said plates and adjacent portions of the side walls, manually removable pins selectively engaging said last named apertures, and a bottom piece on the lower end of the drop front.

* * * * *